Jan. 14, 1930.　　　E. D. HARRINGTON　　　1,743,772
MULTISPEED MOTOR CONTROL SYSTEM
Filed July 2, 1926
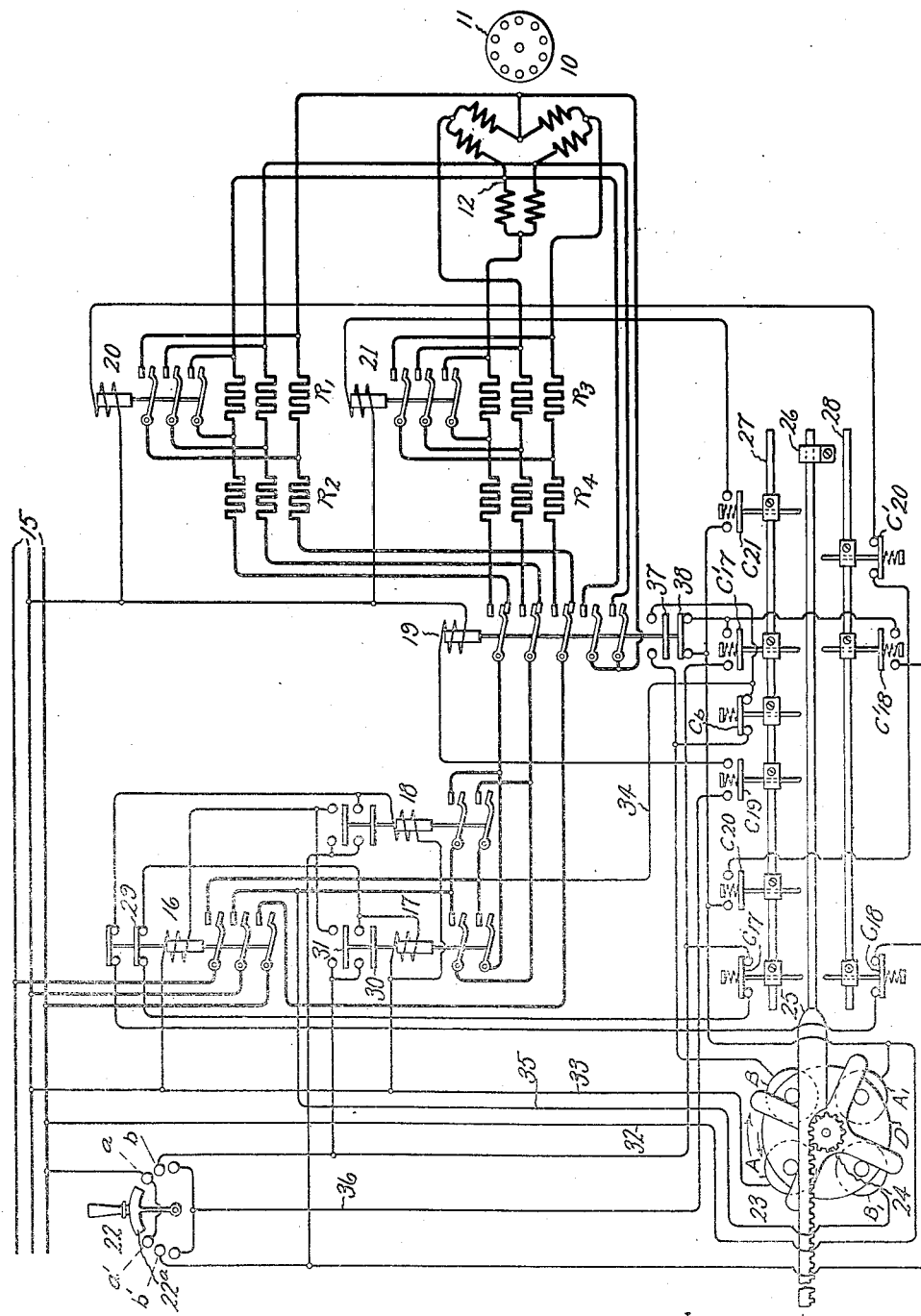
Inventor:
Elliott D. Harrington,
by
His Attorney.

Patented Jan. 14, 1930

1,743,772

UNITED STATES PATENT OFFICE

ELLIOTT D. HARRINGTON, OF SCHENECTADY, NEW YORK, ASSIGNOR TO GENERAL ELECTRIC COMPANY, A CORPORATION OF NEW YORK

MULTISPEED MOTOR CONTROL SYSTEM

Application filed July 2, 1926. Serial No. 120,204.

My invention relates to the control of electric motors, particularly multi-speed electric motors, employed in elevator or other similar service where the motors are frequently accelerated and retarded, and also are operated as braking generators under certain conditions.

The invention provides improved controlling apparatus whereby upon operation of a simple form of master switch the several controlling operations necessary to start the multi-speed motor and effect a smooth and satisfactory acceleration to any selected speed are performed automatically in the proper sequence and at proper time intervals. Also my improved controlling apparatus automatically functions to control the retardation of the motor and to establish braking connections for the motor for a limited time interval under suitable operating conditions.

Briefly, in accordance with my invention all of the various controlling operations are accomplished in the proper sequence and at the proper time interval by means of a single sequencing and timing relay, which is simple and inexpensive in construction, positive and reliable in operation, and moreover, is readily adjustable to meet controlling requirements varying widely in number, sequence, or timing.

While my present invention may be readily adapted to control both alternating current and direct current motors employed in service of the above character, it is particularly advantageous when embodied in a two-speed alternating current elevator control equipment. The single figure of the accompanying drawing is a schematic diagram of a preferred form of the invention embodied in such apparatus.

In the drawing the multi-speed elevator driving motor 10 which is to be controlled in accordance with my invention is shown as a well known form of alternating current induction motor having the squirrel cage rotor 11 suitably connected to the elevator driving mechanism (not shown) and the stator windings 12 arranged to be interconnected to form different numbers of poles as for example, eight poles and four poles, for operation of the motor 11 at low speed and at high speed respectively. It will be understood that as far as my present invention is concerned, the manner of connecting the motor to the elevator driving mechanism and also the manner of arranging the motor windings to obtain multi-speed operation are immaterial and may be accomplished in any desired way. In accordance with the usual practice, an electromagnetic friction brake (not shown) having a movable braking member biased into engagement with a suitable rotating part of the motor or of the elevator driving mechanism preferably is employed to stop and securely hold the motor at rest.

For low speed operation power is supplied to the stator windings of motor 10 from the three phase power supply lines 15 through the line switch 16 and either one of the reversing switches 17 and 18 with the speed-changing switch 19 in its biased position in which it is shown. For high speed operation of the motor the speed-changing switch 19 is operated to its upper position.

Each of these switches is of the electromagnetically operated contactor type and is biased to the open position in which it is shown. The acceleration of the motor 10 to the low operating speed is controlled by the electromagnetic contactor 20, while the acceleration to the high operating speed is controlled by the electromagnetic contactor 21. Accelerating contactor 20 controls a short circuit around the resistor $R^1$, which is permanently connected in the low speed circuit of the motor and accelerating contactor 21 controls the short circuit around the resistor $R^3$ which is permanently connected in the high speed circuit of the motor.

To effect electric braking operation of the motor the speed changing switch 19 is operated to establish the low speed power connections when the motor 10 is operating at a higher speed to permit the motor 10 to return power to the supply line 15 through the reversing and line switches until the speed of the rotor 11 is reduced to the low speed value.

In accordance with my present invention, the several electromagnetic contactors previously mentioned are operated in the proper sequence and at the proper time interval to start, accelerate and retard, as well as establish braking connections of the motor through the agency of the master switch 22 and the cooperating electroresponsive sequencing and timing relay 23. As illustrated, the master switch 22 is of the simple type having an off position intermediate to the operative positions $a$, $b$, and $a'$, $b'$, which respectively control the low speed and high speed operation of motor 10 in the up and down directions of the elevator.

The relay 23 is preferably, although not necessarily, of the induction disk type described and claimed in U. S. Patent No. 1,620,555 to Jones and Wilfe, and dated March 8, 1927, and has the operating windings A and A' arranged to produce a single phase torque for rotating the disk D in a counter-clockwise direction. The operating windings B and B' when suitably energized, serve, in conjunction with the windings A and A', to produce a polyphase torque for rotating the disk D in a clockwise direction. The disk D is mechanically connected as by means of the rack and pinion gearing 24 to reciprocate the actuating plunger or cam 25 between the position in which it is shown and the position in which it engages with the stop 26. The several circuit controlling contacts C of the relay 23 are suitably spaced along the supports 27 and 28 and are provided with actuating pins extending into the path of the actuating cam 25 to be actuated thereby. The contacts C are separately adjustable upon the supporting bars so that the sequence in which the contacts are operated and also the time interval between the operation of the successive contacts may be varied at will. The arrangement also readily permits the number of the contacts to be varied to meet widely varying motor starting and speed regulating controlling requirements. When the contacts C are once properly adjusted and secured to the bars 27 and 28 the sequence in which the contacts are operated upon movement of the actuating cam 25 in each direction is definitely fixed. Likewise, as the disk D is always operated at a substantially constant speed in each direction the time interval between actuation of the successive contacts upon the resulting travel of the actuating cam 25 is definitely fixed.

The operation of the control system is as follows: With the master switch 22 in the off position in which it is shown the operating windings A and A' of the sequencing and timing relay 23 are normally energized through the conductors 32 and 33 from one phase of the supply lines 15 and function to always return the operating cam 25 to the initial position in which it is shown. Upon operation of the master switch 22 to the right into the "up" low speed position $a$ an energizing circuit for the "up" reversing switch 17 is established extending from the lower supply conductor 15 through the two upper right hand contacts of the master switch 22 bridged by the movable contact $22^a$, the normally closed relay contact $C^{17}$, the interlocking contact 29 of the line switch, thence through the operating winding of reversing contactor 17 to the middle supply line 15. As the reverse contactor 17 closes, a holding circuit in parallel to the relay contact $C^{17}$ is completed through the contact 30 and at the same time the operating winding of line switch 16 is energized through the contact 31. Since the speed-changing switch 19 normally is in its low speed position as shown, the closure of the line switch 16 completes the low speed power connections for the motor 10 with the resistors $R^1$, $R^2$ in the low speed energizing circuit. The rotor 11 of the motor 10 at once starts to rotate in the "up" direction as determined by the reversing switch 17, and the resistors $R^1$, $R^2$ are properly proportioned to limit the motor starting torque to a value suitable for effecting smooth starting of the elevator.

The automatic sequencing and timing relay 23 now comes into action to automatically control further operation of the motor 10. As soon as the line switch 16 is closed the windings B and $B^1$ of the relay 23 are energized through a circuit extending through the upper contact of line switch 16, the conductor 34, the normally closed relay contact $C_b$ of the operating windings B and $B^1$, the conductor 35, through the middle contact of line switch 16 to the middle supply line 15. The polyphase torque exerted on the disk D by the joint action of operating windings A and A' and B and B' set the disk into rotation in a clockwise direction. This results in the operation of the actuating cam 25 to the right at a substantially constant speed.

In its travel to the right the operating cam 25 first engages with and operates the normally closed contacts $C^{17}$ and 18 to their respective open positions. After a time interval sufficient to permit the motor 10 to fully accelerate with the resistors $R^1$ and $R^2$ in the energizing circuit the cam 25 engages with and operates the normally open contact $C^{20}$ to the closed position to establish an energizing circuit for the low speed accelerating contactor 20. This circuit may be traced from the middle supply line 15 through the operating winding of contactor 20, the normally closed relay contact $C'^{20}$, the relay contact $C^{20}$, thence through the conductor 32, to the lower supply line 15. The accelerating contactor 20 closes the short circuit about the resistors $R^1$ to increase the torque of motor 10 and permit the motor to accelerate the elevator to full low speed with the stabilizing resistors $R^2$ in circuit with the motor windings 12.

As the operating cam 25 continues its travel to the right, the normally open contact $C^{19}$ is engaged and operated to the closed position a definite time interval after the closure of relay contact $C^{20}$. In case the master switch 22 has been operated to the right into the high speed position $b$ so as to complete the connection between the lower supply lines 15 and the conductor 36, closure of relay contact $C^{19}$ completes the energizing circuit for the operating winding of the speed-changing switch 19, and the latter at once operates to interrupt the low speed power connections of the motor 10 and establish the high speed connections of the resistors $R^3$ and $R^4$ in circuit with the motor winding 12.

However, if the master switch 22 remains in position $a$, the energizing circuit for speed-changing switch 19 is not established and the operating cam 25 continues its travel until the normally closed contact $C_b$ is engaged and operated to the open position. The opening of contact $C_b$ interrupts the circuit through which the relay operating windings B and B' are energized and, consequently, the single phase torque of the operating windings A and A' starts the disk D rotating in the reverse or counter-clockwise direction. As soon as the operating cam 25 is moved to the left sufficiently to permit contact $C_b$ to reclose the energizing circuit for the relay operating windings B and B', the disk D resumes its clockwise rotation and the cam 25 again is operated to the right to reopen the contact $C_b$. The periodic oscillation of the actuating cam 25 continues while the master switch 22 is maintained in the position $a$.

To accelerate the motor 10 to full high speed, the master switch 22 is advanced into the high speed position $b$. This serves to establish the energizing circuit for the operating winding of speed-changing switch 19 as previously pointed out and switch 19 immediately operates to open the low speed power connections of the motor and close the high speed connections for motor 10, the two lower contacts of speed-change switch 19 serving to interconnect the mid-points of the motor windings 12 in a well known manner so as to decrease the number of poles produced by the windings. The resistors $R^3$ and $R^4$ serve to limit the motor torque sufficiently to produce a smooth transition into the high speed connections.

With the speed-change switch 19 closed, the relay contact $C_b$ is shunted by the auxiliary contact 37 with which the speed-changing switch 19 is provided. This permits continued energization of the relay windings B and B' after the relay contact $C_b$ is opened. Hence the operation of the actuating cam 25 to the right is continued and the relay contacts $C'^{17}$ and $C'^{18}$ are next engaged and operated to the closed position. These contacts function in conjunction with the lower auxiliary contact 38 of the speed-change switch to establish a maintaining circuit for the motor line and reversing switches to produce braking operation in a manner which will be described presently.

As the operating cam 25 continues its travel to the right the contact $C'^{20}$ is opened to deenergize the low speed accelerating contactor 20 and the contact $C^{21}$ is subsequently closed after the proper time interval to complete an energizing circuit for the high speed accelerating contactor 21. Upon the resulting short circuiting of the resistors $R^3$ the motor 10 accelerates to full running speed with the regulating resistors $R^4$ in the high speed motor connections. Movement of actuating cam 25 to the right continues until the cam engages with the stop 26 whereupon the induction disk D is stalled.

When it is desired to stop the motor 10 the master switch 22 may be thrown directly to the off position. This interrupts the energizing circuit for speed-changing switch 19 and the latter operates in accordance with its bias to reestablish the low speed power connections for the motor with both the resistors $R^1$ and $R^2$ in the low speed circuit. A maintaining circuit for holding the line switch 16 and the reversing switch 17 is established through the contacts 38 and $C'^{17}$ upon the return of the speed-changing switch 19 to the low speed position. Thus even though the master switch 22 is returned to the off position, the motor 10 is maintained connected to the supply lines 15 under the complete control of the relay 23. The maintaining circuit for the reversing switch 17 may be traced from the motor supply line through the conductor 32, the contact 38 with the speed-change switch 19 in the low speed position, the contact $C'^{17}$ thence through the auxiliary contact 30 and operating winding of reversing contactor 17 to the middle supply line 15. Operating winding of line switch 16 is maintained energized through the auxiliary contact 31 of the reversing contactor 17. It will be evident that in case the speed-change switch 19 should fail for any reason to return to the low speed position, contact 38 will remain open and the line switch 16 and reversing switch 17 will be deenergized immediately upon operation of the matter controller 22 to the off position and thus at once disconnect the motor 10 from the supply lines 15.

As long as the actual operating speed of the motor 10 is above the normal low speed value the motor functions as a regenerative brake to slow down the load driven by the motor and return energy to the supply lines 15. Both of the resistors $R^1$ and $R^2$ serve as buffer resistors to limit the braking torque exerted by motor 10 to a value just sufficient to smoothly start deceleration of the elevator load when the braking connections are initially established with the motor operating at full high speed.

Simultaneously with the establishment of the braking connections of motor 10 by the return of speed-changing switch 19 to its bias position, the energizing circuit of the operating windings B and B' of relay 23 is interrupted at the contact 37. As a result, the single phase torque of operating windings A and A' immediately start the return movement of the actuating cam 25 to the left. After the cam 25 leaves the stop 26 the contact $C^{21}$ is permitted to open and deenergize the high speed accelerating contactor 21. Continued movement of the actuating cam to the left next permits the contact $C'^{20}$ to close the energizing circuit for the accelerating contactor 20. When the contactor 20 closes the resistors $R^1$ are removed from the braking circuit of the motor 10 to allow an increased braking torque to be obtained so as to increase the retarding effect upon the elevator. Further return movement of cam 25 serves to open the contacts $C'^{17}$ and $C'^{18}$ after a time interval during which the increased braking torque of the motor 10 ordinarily is capable of reducing the speed of the motor to substantially the normal low speed value.

Upon the opening of contact $C'^{17}$ the maintaining circuit for the reversing switch 17 and the line switch 16 is interrupted and these switches open in accordance with their bias and disconnect the motor 10 from the supply lines 15. The return movement of actuating cam 25 to the left continues until the initial position is reached in which the disk D is stalled.

It should be noted that until the cam 25 is returned to the initial position, it is impossible to reconnect the motor 10 to the supply lines 15 due to the fact that the energizing circuit for the reversing switches 17 and 18 are interrupted respectively by the relay contacts $C^{17}$ and $C^{18}$. This effectively prevents operation of the several motor controlling switches in an improper sequence at an improper time.

In case the master switch 22 is operated to the left into either the low speed position $a$ or the high speed $b'$, exactly the same sequence of operations in accelerating motor 10 is produced by the relay 23 except that the reversing switch 18 instead of reversing switch 17 is closed. Likewise, the switching sequence in establishing the braking connections for the motors and in disconnecting the motor from the supply lines 15 is the same as that previously described.

From the foregoing it will be seen that a control equipment embodying my present invention is entirely automatic in its operation and absolutely insures the proper sequence and timing of the switching operations to give smooth acceleration and the deceleration, as well as braking operation of the motor.

Furthermore, all the sequencing and timing operations are combined in a single relay which is positive in its action and readily permits adjustment to meet almost any desired motor controlling conditions. The unitary sequencing and timing relay also has the additional advantage that the exact sequence and the relative timing is visually indicated by the location of the several relay contacts along the path of travel of the actuating cam, thus greatly facilitating proper adjustment of the sequencing and timing operations.

It will be understood that although I have illustrated and described a preferred embodiment of my invention, the arrangement shown is susceptible of considerable modification to meet various operating requirements without departing from the true spirit and scope of the invention.

What I claim as new and desire to secure by Letters Patent of the United States, is:

1. In a system of motor control, a motor, switch mechanism for controlling the starting and speed regulation of said motor, an electro-responsive device provided with a plurality of windings, operable in different directions for controlling said switch mechanism, a master switch and connections controlled thereby through which said master switch controls all of said windings to operate said electro-responsive device in one direction to vary the speed of the motor, and controls only a portion of said windings to vary the speed of the motor in the opposite sense.

2. In a system of motor control, a motor, switch mechanism for controlling the accelerating and decelerating operations of said motor, an electro-responsive relay having a plurality of windings and a movable member operable in opposite directions under the control of said windings for controlling said switch mechanism, connections through which a portion of said windings is normally continuously energized to operate said element in one direction to effect one of said operations, a master switch and connections controlled thereby through which the remainder of said windings is energized to cooperate with said portion to operate said element in the opposite direction to effect the other of said operations.

3. In a system of motor control, a motor, switch mechanism including a series of separately movable contacts for controlling the starting and accelerating operation and the decelerating and stopping operation of said motor, a master switch and an electro-responsive time element device having a plurality of windings controlled thereby for operating said series of contacts in different directions in predetermined sequences after predetermined time intervals, and connections controlled by said master switch through which all of said windings are energized to operate said series of contacts in one direction to effect one of said operations, and through which only a portion of said windings is employed to effect the other of said operations.

4. In a system of motor control, a motor, a series of separately operable contacts each biased to a predetermined position and operable to a second position to control the starting and stopping operations of said motor, an electro-responsive device for operating said series of contacts in a predetermined sequence after predetermined time intervals, said device being provided with a plurality of windings, a master switch and connections controlled thereby through which all of said windings are energized to operate said contacts from their biased positions to effect one of said operations.

5. In a system of motor control, a motor, electroresponsive switch mechanism operative to effect starting of said motor, separately operable switches operative to effect speed regulation of said motor, an electroresponsive device having a plurality of windings for controlling the operation of said switches, a portion of the windings of said electroresponsive device being connected to be normally continuously energized to effect operation of said switches to decelerate the motor, a master switch, and connections controlled thereby through which said motor starting switch mechanism is operated and the remainder of the windings of said electroresponsive device are energized to effect operation of said switches to accelerate the motor.

6. The combination with an electric motor having low speed and high speed connections, of means including a master switch and a time element electroresponsive relay controlled thereby and having a series of contacts corresponding respectively to said low speed and said high speed connections arranged to be operated sequentially after predetermined time intervals for successively establishing the low speed and high speed power connections of the motor and controlling the acceleration of the motor to each operating speed.

7. The combination with an electric motor having low speed and high speed connections, of means including a master switch having a low speed and a high speed position and a cooperating electroresponsive relay having a series of contacts corresponding respectively to said low speed and said high speed connections arranged to be operated successively at predetermined time intervals after operation of the master switch to either the low or high speed positions for controlling the starting and acceleration of the motor to the corresponding operating speed.

8. The combination with an electric motor having low speed and high speed connections and a plurality of separately operable electroresponsive switches for establishing the low speed and the high speed power connections for the motor and controlling the acceleration of the motor to each speed, of an electroresponsive relay having a series of contacts corresponding respectively to said low speed and said high speed connections arranged to be operated in sequence at predetermined time intervals for automatically controlling the energization of said electroresponsive switches to prevent establishment of the high speed motor connections for a predetermined time interval after the establishment of the low speed motor connections and for automatically controlling the acceleration of the motor to each operating speed.

9. The combination with an electric motor having low speed and high speed connections and a plurality of separately operable electroresponsive switches for establishing low speed and high speed connections for the motor and controlling the acceleration of the motor to each speed, of means including a master switch and a time element electroresponsive relay controlled thereby and having a series of contacts corresponding respectively to said low speed and said high speed connections arranged to be operated in sequence at predetermined time intervals for controlling the energizing circuits of said separately operable electroresponsive switches to successively establish the low speed motor connections, accelerate the motor to full low speed, interrupt the low speed connections, establish the high speed connections and accelerate the motor to full high speed at predetermined time intervals after operation of the master switch.

10. The combination with an electric motor having low speed and high speed connections, of means including a master switch and a time element electroresponsive relay controlled thereby and having a series of contacts corresponding respectively to said low speed and said high speed connections arranged to be operated sequentially after predetermined time intervals for successively establishing the low speed and high speed power connections of the motor and controlling the acceleration of the motor to each operating speed, said relay having contacts for automatically establishing braking power connections for the motor after operation at high speed.

11. The combination with an electric motor having low speed and high speed connections, a separately operable line switch mechanism, electroresponsive speed-changing switch mechanism, and electroresponsive accelerating switch mechanism for the motor, of means for controlling said switch mechanisms including a time element electroresponsive relay having a series of contacts arranged to be operated successively at predetermined time intervals, and connections controlled by said relay for operating the said separately operable electroresponsive switch mechanisms to successively establish the low speed and high speed power connections of the motor and control the acceleration of the motor to each operating speed, said relay having the said series of contacts arranged so that the low speed power connections for the motor are automatically established for a predetermined time interval after operation thereof at high speed.

12. The combination with an electric motor having low speed and high speed connections, a separately operable electroresponsive line switch mechanism, and electroresponsive speed-changing switch mechanism for the motor, of means for controlling said switch mechanisms including an electroresponsive relay having a series of contacts arranged to be operated successively after a predetermined time interval for insuring establishment of the low speed power connections of the motor for a predetermined time interval before and after establishment of the high speed power connections of the motor.

13. The combination with an alternating current electric motor having low speed and high speed connections, a separately operable electroresponsive line switch mechanism, electroresponsive speed-changing switch mechanism, and electroresponsive accelerating switch mechanism for the motor, of means for controlling said switch mechanisms including an electroresponsive relay having a series of contacts arranged to be operated successively after a predetermined time interval for insuring establishment of the low speed power connections of the motor for a predetermined time interval before and after establishment of the high speed power connections of the motor.

In witness whereof, I have hereunto set my hand this 30th day of June, 1926.

ELLIOTT D. HARRINGTON.